Jan. 27, 1959  E. J. WALK  2,870,615
SHAFT COUPLING WITH SYMMETRICAL LOAD DISTRIBUTION
Filed July 17, 1956  2 Sheets-Sheet 1

INVENTOR.
EMIL J. WALK
BY
*Wade Koontz*
*Charles H. Wagner*
ATTORNEYS

Jan. 27, 1959    E. J. WALK    2,870,615
SHAFT COUPLING WITH SYMMETRICAL LOAD DISTRIBUTION
Filed July 17, 1956    2 Sheets-Sheet 2

INVENTOR.
EMIL J. WALK
BY
ATTORNEYS

United States Patent Office 2,870,615
Patented Jan. 27, 1959

2,870,615

SHAFT COUPLING WITH SYMMETRICAL LOAD DISTRIBUTION

Emil Johann Walk, Dayton, Ohio

Application July 17, 1956, Serial No. 598,484

4 Claims. (Cl. 64—19)

(Granted under Title 35, U. S. Code (1952), sec. 266)

The invention described herein may be manufactured and used by or for the United States Government for governmental purposes without payment to me of any royalty thereon.

This invention relates to shaft coupling devices and, more particularly, to improved shaft to shaft couplings with symmetrical load distribution for transmitting rotary torque from one shaft to the other at high rotational speeds, an object of the invention being the provision of a simple, inexpensive coupling means for uniformly transmitting torque from a drive shaft to a driven shaft, preferably, but not necessarily, coaxial, so that the torque is imparted uniformly with respect to the driven shaft.

A further object is the provision of shaft coupling means that will transmit the torque from a drive shaft to a driven shaft symmetrically to the center line of the driven shaft.

A further object is the provision of a coupling means for transmitting rotary torque from a rotary driving member to a driven shaft symmetrically of the driven shaft at high speeds, medium heavy loads, and during acceleration and deceleration of the rotary driving member and/or the driven shaft.

A still further object is the provision of a shaft coupling that will transmit torque from a drive shaft to a driven shaft symmetrically to the center line of said shafts regardless of misalignment between said shafts or angular displacement of one shaft with respect to the other shaft.

A further object is the provision of rotary coupling means that will positively, directly transmit torque uniformly from a rotary driving member to a substantially symmetrical rotary driven member at points substantially diametrically opposite at opposite sides of the axes of said members.

A still further object and advantage of my coupling means is the provision of a rotary coupling having one member adapted to be removably secured to one of the drive or driven shafts and carrying two torque transmitting members movable relative to each other and to said one member, symmetrically relative to the axis of said one member, each of the torque transmitting members having abutment means engageable with a second coupling member at equally radially spaced points at opposite sides of the rotary axis of the second coupling member for transmitting torque between the first and second mentioned coupling members symmetrically at substantially diametrical sides of the rotary axes of said coupling members.

Other objects and advantages of the invention will become apparent from the following description and accompanying drawings in which like reference characters refer to like parts in the several figures.

Drawings

Specification

Figure 1:
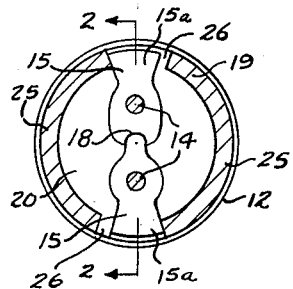
Figure 1 is a transverse sectional view through a line shaft coupling, illustrating one embodiment of my invention.
Figure 2:
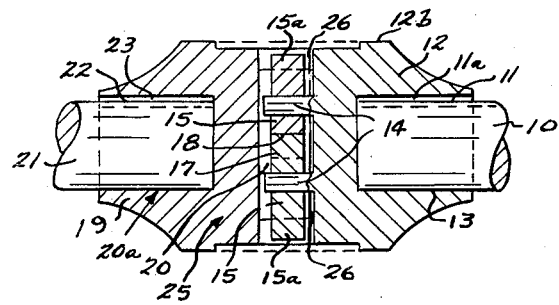
Figure 2 is a longitudinal sectional view taken about on the plane indicated by line 2—2 of Figure 1.
Figure 3:
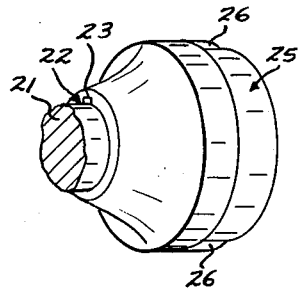
Figure 3 is an exploded view in perspective, of the parts constituting the coupling shown in Figures 1 and 2.
Figure 3:
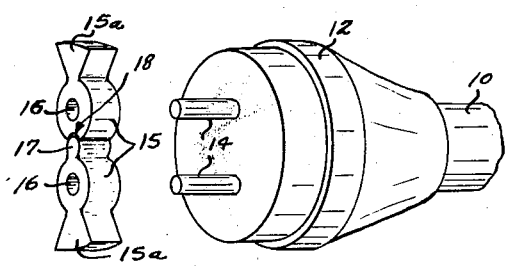

Reference being made to the preferred form of my invention illustrated in Figures 1, 2 and 3, the reference numeral 10 denotes a rotary shaft keyed in the socket or annular recess 13 of a coupling element 12, a keyway 11ª being formed in the element 12 to receive a key or spline member 11 so that when the coupling element or housing 12 is assembled on the shaft 10 the shaft will impart its torque directly to the element 12 as though the element 12 was formed integral with the shaft.

Stub axles or pivot shafts 14 project from the end face of the element 12 parallel to its axis and equally spaced at opposite sides of said axis, or are symmetrical to the center line of the end face.

Torque transmitting members 15 in the form of centrally pivoted levers are pivoted on the posts 14, one of the members 15 being provided with a cylindrical extension 17 on one end thereof disposed to swing through the axis of the rotary element 12 when that lever 15 is swung about its pivotal post 14, the other of the torque transmitting members 15 being provided with a complemental socket or cylindrical recess 18 on the end thereof shaped to fit or receive the cylindrical extension 17 so that when either one of the levers 15 is rotated about its pivot on its post 14 the other lever 15 is correspondingly rotated in the opposite direction through the keying action between the extension 17 and recess 18.

The second element or casing of the coupling unit is indicated at 19 and is generally similar in outside contour to the casing 12, but is formed with an internal cylindrical recess 20 opening outwardly symmetrically at opposite sides of the casing to form the outwardly flared slots 26 between the adjacent ends of the circularly curved abutment wall or peripheral flange 25.

The slots 26 are of sufficient width to freely receive the outer dovetail ends 15ª of the torque levers 15, the ends of the wall 25 forming abutment means, or shoulders for impinging engagement with the ends 15ª of the torque levers 15.

The depth of the slots 26 and the recess 20 is sufficient to receive the two torque levers 15 and the pivot posts 14, bringing the face of the first element 12 nearly flush with the outer end surface of the curved abutment wall 25. If desired the casings 12 and 19 may be formed with annular abutment flanges or shoulders 12ᵇ as shown in Figure 2 and a suitable thin dust guard clamped on one of said members 12 or 19 and loosely, slidably engaging the other member to permit slight axial, lateral, and angular misalignment between the shafts 10 and 21, but still exclude the entrance of most dust or foreign matter from the interior of the coupling members. The coupling member 19 is also formed with a socket 20ª to receive a shaft 21, the socket having a keyway 23 to receive the key 22.

In the operation, regardless of whether the shafts 10 and 21 are coaxial or slightly transversely or angularly misaligned, when rotary torque is applied to one of the shafts the connected coupling member or casing, for instance 12, is rotated to displace the pivot posts 14 about the axis of the coupling 12. This impinges the tail ends 15ª of the centrally pivoted torque levers 15, rocking one lever and through the interengaging connections 17 and 18 at the inner ends of the levers, the other lever 15 of the pair is rocked about its pivot post 14 in the opposite direction to bring its tail portion 15ª into impinging abutment with the opposite end of the other abutment wall 25 at the side of the other slot 26. Thus the pivotal lever and linkage means are automatically self adjusting when the drive shaft is rotated in either direction and provides a pair of torque transfer means disposed symmetrically spaced at opposite sides of the rotary axis of the coupling members for positively and directly transmitting rotary torque from a drive shaft to a driven shaft in symmetrical fashion.

Figure 4:
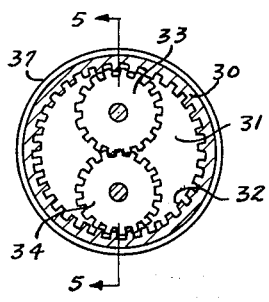
Figure 4 is a transverse sectional view through a shaft coupling device illustrating a slightly modified embodiment of my invention.
Figure 5:
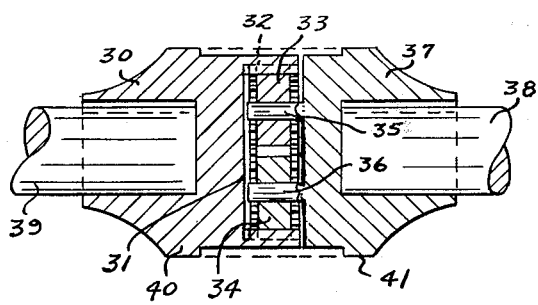
Figure 5 is a longitudinal sectional view taken about on line 5—5 in Figure 4.
Figure 6:
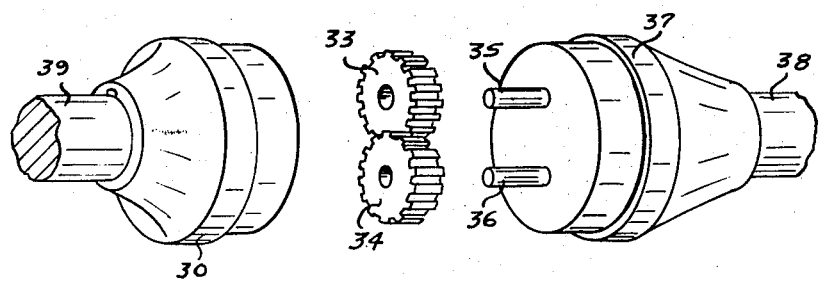
Figure 6 is an exploded view, in perspective, of the form of the invention disclosed in Figures 4 and 5.

Referring to Figures 4, 5 and 6, in which a slight modification is shown, the reference numeral 30 denotes one of the casing of the shaft coupling corresponding to the casing 19 exteriorly and having an annular or cylindrical recess 31 formed with an internal ring gear 32, a pair of intermeshing gear members 33 and 34 are provided, rotatable within the recess 31 in meshing relation at opposite sides of the casing with the ring gear 32, these gears 33 and 34 being identical in size and meshing with each other at the central axis of rotation of the coupling. The gears 33 and 34 are formed with bearing apertures through which extend the two pivot posts 35 and 36 which extend from the complemental or other casing member 37 of the coupling which is fixed to the shaft 38 similar to the keyed connection 11 in Figure 2.

The annular recess 31 is sufficient in depth to receive the two gears 33 and 34 and provide clearance for the outer ends of the two stub shafts 35 and 36. The other casing 30 is keyed to the other shaft 39, similar to the key connection shown in Figure 2. Annular flanges 40 and 41 are disposed to receive a dust guard therebetween if desired.

In the operation of the coupling shown in Figures 4 to 6, rotation of one of the housings 30 or 37 relative to the other causes the ring gear 32 to rotate the gears 34—35 in the opposite direction until any slack is taken up between the teeth of the meshing gears 33 and 34, due to the rotation in opposite directions. Once slack is taken up, the other casing member, through the stub shafts 35, 36, provides a positive symmetrical driving connection between the shafts 38 and 39 through the intermeshing gears 33 and 34 and the parts or stub shafts 35 and 36, and a positive, simple, symmetrical automatic, torque application between two relatively rotatable members is provided.

Figures 7, 8:
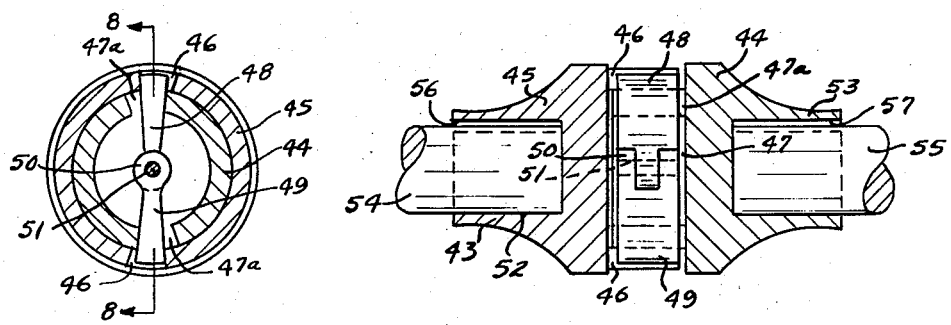
Figure 7 is a transverse sectional view through a shaft coupling illustrating a further modification of my invention.
Figure 8 is a longitudinal sectional view taken about on line 8—8 of Figure 7.
Figure 9:
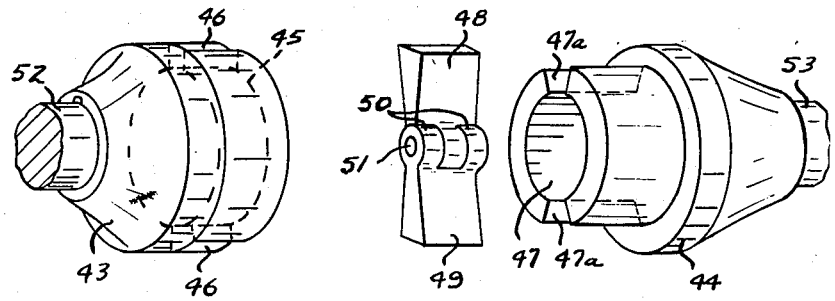
Figure 9 is an exploded view in perspective of the parts constituting the modification shown in Figures 7 and 8.

Referring to the modification illustrated in Figures 7 to 9, one of the coupling members is indicated at 43 and the other coupling member 44 telescopes within the circular recess 45 and is formed with opposite, radial outwardly flared slots or openings 46 to form spaced radial abutments at the opposite ends of the circular walls of the torque coupling member or casing 43.

The other or male coupling member 44 is cylindrical to rotatably fit or seat in the socket 45 and is provided with a smaller central circular or cylindrical recess 47 and formed with outwardly flared radial slots 47ª at diametrically opposite sides of the casing 44 to register with the slots 46 in the casing 43 when the two casings 43 and 44 are telescoped together. A pair of hinged abutment members 48 and 49 of substantially rectangular shape are provided with their free end portions, one disposed in each of the aligned slots 46, 47ª when the coupling members are assembled. The hinged joint portions 50 of the two members 48 and 49 is circular or cylindrical to fit within the cylindrical recess 47 to permit some play but retaining the flat sides of the hinged together members 48 and 49 within the slots 46 and 47ª to permit self adjustment between the two abutments and the abutting edges of the slots 46, 47ª when the driving, and driven members are rotated relative to each other, thus forming a symmetrical, coaxial self adjusting driving abutments between the telescoped members 43 and 44. The hinge pivot between the two abutment members 48 and 49 is the pin 51, also the two members 44 and 43 are socketed at 52, 53 to receive the shafts 54 and 55 and keys 56, 57, similar to Figures 2 and 5.

When rotative torque is applied, for instance, to the shaft 54 the casing 43 is rotated to bring the edges of the slots 46 into impingement with the opposite flat surfaces of the two hinged members 48 and 49, tending to rotate the latter in the socket 47 until the other two opposite flat surfaces impinge the opposite ends of the other two slots 47ª which establish a symmetrical driving relation between the two coupling members 43 and 44.

The above specification and accompanying drawings are for exemplary, rather than restrictive purposes, and therefore various changes may be resorted to, which fall within the spirit of the invention and scope of the appended claims.

I claim:

1. In a symmetrical torque transmitting coupling, a first rotary coupling member, a second rotary coupling member in normal coaxial relation with said first coupling member, one of said coupling members adapted to be fixed to a first shaft for rotation therewith, the other of said coupling members adapted to be fixed to a second shaft, said one coupling member having a concentric cylindrical recess formed therein having diametrically opposite abutment means in the wall thereof, a pair of interengaging torque transmitting members pivoted in said second element in symmetrical relation to the rotary axis thereof in interlocking driving relation with said diametrically opposite abutment means; whereby said members are self-adjustable through their interengaging portions to apply rotative torque symmetrically from one of said coupling members to the other upon rotation of one of said members, said second coupling member incorporating a pair of elongated thrust transfer elements projecting inwardly therefrom into the recess formed in said first coupling member, and said torque transmitting members comprising a pair of self-adjusting torque levers intermediately pivoted to said pair of thrust transfer elements within the recess formed in said first coupling member, one of said pair of torque levers having an extension formed on the inner end thereof in complemental engagement with the inner end of the other of said pair of torque levers and each of said pair of torque levers having an outer end normally in a disengaged position within a respective diametrically opposed abutment means and movable to interlocking driving engagement therewith when rotary torque is applied to one of said shafts.

2. A coupling device for substantially aligned driving and driven shafts comprising, a driving coupling member adapted to be keyed to the driving shaft, a second substantially complemental driven coupling member adapted to be keyed to the driven shaft, said coupling members comprising similar cylindrical bodies disposed in substantially aligned juxtaposed concentric relation when mounted on said shafts, a first one of said members having an annular concentric axial recess formed therein having diametrically opposite radial slotted abutment means in the wall of said cylindrical body which is formed by the recess, a second of said members having elongated thrust transfer means projecting therefrom into said recess in said first member and self adjusting uniform thrust transfer abutment means carried on said elongated thrust transfer means having outer ends disposed in thrust transfer engagement with said radial abutment means, said elongated thrust transfer means comprising a pair of eccentric posts projecting outwardly from the juxtaposed face of said second member parallel to the axis thereof into said annular recess, and a pair of flat thrust members pivotally mounted on said posts each having an outer end freely received in respective slotted abutment means and in positive thrust transfer engagement therewith when said shafts are either in or out of correct alignment and rotary torque is applied to one of said shafts, one of said pair of flat thrust members having a projecting, elongated inner end in complemental engagement with the inner end of said outer thrust member in normal alignment with the longitudinal axis of said driving shaft and transferring thrust therebetween when one or the other of said thrust members is rocked about its pivot.

3. A coupling device for the symmetrical transmission of torque between two rotary members comprising a rotary drive shaft, a first coupling element assembled in fixed relation on said drive shaft, a rotary driven shaft in axial alignment with said drive shaft, a second coupling element assembled in fixed relation on said driven shaft and having an internally formed recess opening outwardly at symmetrically opposite sides into a pair of diametrically opposed outwardly flared slots, and interengaging, self-adjusting torque transmitting means positioned between said drive and said driven shafts comprising a pair of pivot shafts projecting inwardly from said first coupling element into the internally formed recess of said second coupling element parallel to and equally spaced at opposite sides of the axis of said first coupling element, a pair of centrally pivoted levers mounted on said pair of pivot shafts, one of said pivoted levers having an extension on its inner end disposed to swing through the axis of said first coupling element and the other of said pivoted levers having a recess formed on its inner end in complemental engagement with said extension, the opposite outer ends of said levers freely received in said pair of diametrically opposed slots formed in the internally formed recess in said second coupling element for engagement with the edges of said slots when any relative rotative movement occurs between said drive and driven shafts.

4. A shaft coupling device for normally aligned driving and driven shafts comprising a driving coupling member keyed to the driving shaft, a second driven coupling member keyed to the driven shaft and having a concentric recess with a pair of opposed peripheral abutment means in communication with said recess, and means positioned between said driving and driven shafts ensuring symmetrical transmission of relative torque between said driving and driven coupling members comprising a pair of projecting pivot pins mounted on said driving coupling member extending into the concentric recess of said driven coupling member, and a pair of torque transfer coupling arms centrally pivoted to said pivot pins each incorporating complementally engaged key means on the inner ends thereof adapted to swing through the axis of said driving coupling member and having the outer ends thereof retained in positive engagement with said pair of opposed abutment means both on correct alignment and on disalignment between the axes of said driving and driven shafts on application of any rotary torque to either of said shafts.

References Cited in the file of this patent
UNITED STATES PATENTS

| | | |
|---|---|---|
| 545,920 | Sperry | Sept. 10, 1895 |
| 1,827,811 | Derrick | Oct. 20, 1931 |
| 2,521,289 | Gerst | Sept. 5, 1950 |
| 2,626,812 | Jones | Jan. 27, 1953 |

FOREIGN PATENTS

| | | |
|---|---|---|
| 630,407 | France | Dec. 2, 1927 |
| 646,055 | France | Nov. 7, 1928 |